March 29, 1938.  J. H. CLO  2,112,519
AIR SEAL FITTING
Filed March 8, 1935
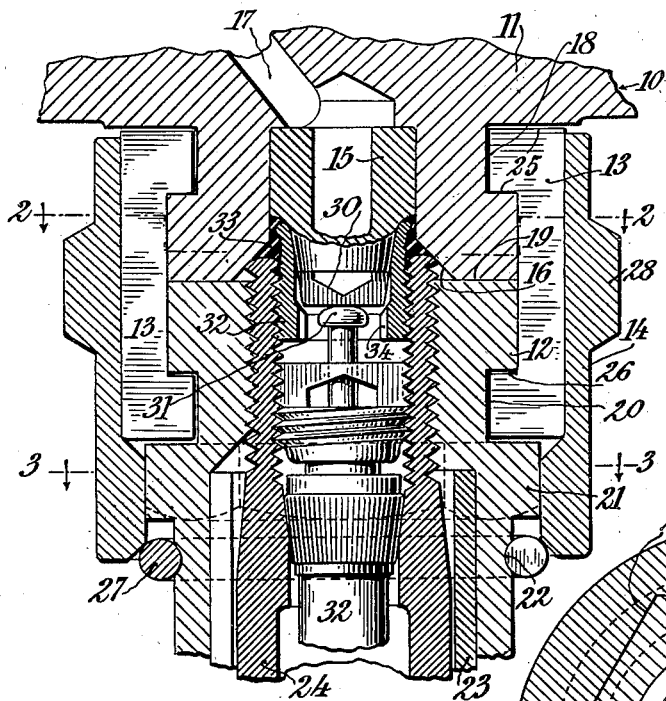
INVENTOR
Jay Harry Clo
BY
Fraser, Myers & Manley
ATTORNEYS.

Patented Mar. 29, 1938

2,112,519

UNITED STATES PATENT OFFICE 2,112,519

AIR SEAL FITTING

Jay Harry Clo, Baldwin, N. Y., assignor to Scovill Manufacturing Company, Waterbury, Conn., a corporation of Connecticut Application March 8, 1935, Serial No. 9,943

7 Claims. (Cl. 284—19)

My present invention relates to a fitting for providing a fluid-tight joint between elements which are to be coupled together. More particularly, it relates to a fitting having means therein for providing an air-tight seal between said fitting and a tire valve stem when said fitting is connected to the nipple or inflating end of such valve stem.

The primary objects of my invention are to provide a fitting which will maintain and insure an air-tight joint between coupled elements under conditions of considerable vibration and elevated temperature. A further object is to provide a fitting wherein the air-tight seal between the coupled elements will improve with age. A further object is to provide a fitting of the class set forth, wherein a new sealing element can be quickly, easily and cheaply substituted for the one within the fitting should said sealing element become damaged when disengaging the coupled parts for any reason whatsoever.

The foregoing and other objects of my invention, which will become apparent from the detailed description which follows, I accomplish by providing a fitting having a metal bushing therein provided with a rubber gasket, the parts being so coordinated that a double seal will be provided between the fitting and the part to which it is connected, at least one of said seals being between metal and metal, and another being between rubber and metal. The bushing element of the fitting is preferably formed as a separate and replaceable element with both the metal and rubber parts thereof being adapted to be deformed under pressure to make air-tight sealing contacts with the other parts which they engage.

A preferred embodiment of my invention is illustrated in the accompanying drawing, wherein:—

Figure 1 is a longitudinal section of a fitting embodying my invention applied to a tire valve stem, parts of said figure being shown in elevation.

Fig. 2 is a transverse section taken substantially along the planes of the broken line 2—2 of Fig. 1.

Fig. 3 is a transverse section taken substantially along the plane of the line 3—3 of Fig. 1.

Fig. 4 is a diametrical section through the bushing sealing element forming part of my invention, said section being taken at a right angle to the section of said element shown in Fig. 1.

The air seal fitting illustrated in the accompanying drawing is one primarily designed for connecting a tire valve pressure equalizer to the tire valve stems of tires, the pressures within which are to be equalized. Usually these pressure equalizers are fitted on wheels provided with twin or multiple tires, such as are used on the wheels of large motor buses, motor trucks and the like, in the operation of which the equalizers and their connections with the tire valve stems are subjected to considerable vibration and where the particular valve stem is located in proximity to the brakeband of the wheel the fitting is also subjected to an elevated temperature, which, in time, causes a vulcanizing action upon the rubber gaskets employed in providing the air-tight seals for the connection between the fittings and the valve stems.

In the drawing, the reference numeral 10 indicates as a whole a fitting or fixture provided at one end of an equalizer unit (not shown), said fitting comprising a body portion 11, a union 12, a collar 13 for connecting the body and union together in swiveled relation, an outside sleeve 14 and a tire valve pin depressor 15.

The body portion 11, which is preferably formed of metal or the like, has a central bore therein which terminates at its outer end in a flared or tapered seating face 16, and at its inner end has an offset passage 17 which leads to the equalizer unit proper. On its exterior the body portion has an annular recess 18, and at its outermost end a flat face 19.

The union 12 has a central screw-threaded bore for engaging over the threads on the valve stem nipple, and at its inner end, that is, the end which is complemental to the outer end of the body 11, is provided with a flat face for engaging the flat face 19 of the body 11. On its exterior the union 12 has an annular recess 20, and below said recess the exterior of the body is formed with an enlarged wrench-engaging surface 21, below which the body of the union is again reduced in diameter and in close proximity to the enlarged wrench-engaging surfaces of the body of the union, the reduced portion is formed with a shallow annular recess 22. Below the screw-threaded portion of the union, the diameter of the bore is enlarged to engage over a valve stem body, and as herein shown, there is fitted within said enlarged bore a split spring sleeve 23 for snugly engaging the body portion of a tire valve stem 24.

The collar 13 is formed at one end with an inwardly-directed flange 25 and at its other end with an inwardly-directed flange 26 for engaging within the annular recesses 18 and 20, respectively. To permit of the assembly of the collar 13 into engaging relation with the body 11 and the union 14, the collar is preferably made in two semi-circular sections, as best shown in Fig. 2, and to provide a swiveled connection between the collar and the respective parts, the flanges on the collar are of less height than the recesses 18 and 20.

The collar 13 is held in assembled and uniting relation with respect to the parts 11 and 12 by the sleeve 14 which has an internal diameter to permit it being force-fitted over the sections of the collar 13. At its lower end the sleeve 14 is formed with a polygonal bore which is complemental to the polygonal form of the enlarged portion of the union provided with the wrench-engaging surfaces 21, and is fitted thereover and held in such relation by a split spring ring 27 fitted in the annular recess 22, the outer diameter of the split spring ring being normally greater than the smallest diameter of the sleeve 14. It will thus be seen that the sleeve 14 will frictionally grip the split collar 13 and will be rotatable therewith, and in view of the complemental polygonal surfaces on the sleeve 14 and the union 12, rotation of the sleeve will cause rotation of the union relative to the body 11, or, in other words, the sleeve 14 provides a swiveled connection between the union 12 and the body 11. To promote and facilitate rotation and the application of force to the sleeve 14, it is formed with an enlarged portion 28 having wrench-engaging surfaces.

The tire valve pin depressor 15, which is preferably formed of metal or the like, consists of a plug having a cylindrical portion of a diameter to be force-fitted into the bore of the body 11 and of a length less than that of said bore, and a reduced or tapered portion, which, when said member 15 is force-fitted into the bore of the body 11, will provide a tapered reentrant projection within said bore. The member 15 has a blind bore therein which terminates short of the smallest end of the tapered portion, and to provide a through passage through said member the tapered ends thereof on opposite sides of a diameter are cut away to provide a so-called bridge 30 which is adapted to engage the top of a valve pin 31 of a conventional tire valve core 32 to unseat the valve plunger thereof (not shown) when the fitting is threaded over the valve stem 24.

In order to insure an effective and efficient air seal between the fitting and the tire valve when said parts are coupled together, I provide a bushing 32 which is externally screw-threaded for a portion of its length to engage the internal threads in the valve stem nipple, and is provided on its exterior above said screw-threads with a gasket or annulus 33 of compressible material, preferably rubber, which may be suitably fixed to the bushing by cement or vulcanization. Preferably the gasket 33 has its top and bottom surfaces tapering outwardly toward each other from the body of the bushing so that the gasket is of less thickness at its outer periphery than at its inner periphery. The bushing is also preferably formed of relatively thin metal or the like so as to be capable of annular deformation when subjected to radial outward pressure, such, for example, by engagement with the tapered face of the reentrant projection of the valve pin depressor 15. To facilitate the application of the bushing into a valve stem nipple said bushing at its inner end is somewhat thickened and formed with a diametrically opposed recess 34 for accommodating a screw-driver or other suitable tool.

The dimensions and shape of the gasket 33 is such that when the bushing 32 is screw-threaded home into the valve stem the face 35 of the gasket will provide a leak-tight seal with the end or mouth of the valve stem nipple but will not spread out over said entire face. Then as the fitting 11 is screw-threaded over the valve stem the tapered projection on the valve pin depressor will engage within the top of the bushing and the tapered seating face 16 will contact with the packing 33, and as the fitting advances onto the valve stem, the following actions will take place substantially simultaneously:

(1) The tapered reentrant projection on the depressor 15 will engage within the mouth of the bushing 32, make a metal to metal contact therewith and radially expand or deform the top of said bushing so that the rubber packing thereof will be squeezed or compressed up into the bore of the body 11 and into contact with the enlarged portion of the depressor 15;

(2) The tapered seating face 16 on the body 11 will contact with the top of the valve stem nipple to make a metal to metal contact therewith; and (3) The rubber gasket 33 will be compressed between said seating face 16 and the top of the valve stem to make a rubber to metal seal with both the valve stem and body 11.

As a result of the foregoing connection, the following advantageous effects are accomplished:

(1) The engagement of the bushing within the valve stem reinforces the threads thereof and insures an air-tight seal between said parts;

(2) The depressor 15 holds the valve unseated, spreads the wall of the bushing outwardly, thus compressing the rubber and providing a binding contact which will prevent turning of the complete fixture 10 on the valve stem even under the conditions of vibration encountered in use;

(3) The forced engagement between the tapered projection on the depressor and the internal wall of the bushing provides a rigid metal to metal contact which further tends to promote the rigidity of the connection between the fixture and the valve stem;

(4) The rubber of the gasket 33 is compressed into all crevices and joints, thus insuring a leak-tight connection between the parts; and (5) The metal to metal contact and seal provided by the engagement of the tapered seating face 16 with the top of the valve stem further tends to insure a rigid holding of the fixture on the valve under operating conditions. Furthermore, the rubber gasket being subjected to high compression results in adhesion of the rubber to the metal parts especially under conditions of heat and age, thus further insuring an air-tight seal between the connected parts.

With the present device it will also be appreciated that upon removal of the fitting for any reason whatsoever, a new bushing and gasket can be quickly and easily substituted for the one within the valve stem, and thereby at all times insure the effectiveness of the air-tight seal at a very nominal cost.

Although the invention as herein disclosed has been described in connection with a fitting used in equalizer valves, it will be apparent that the invention is susceptible of use in other connections where an air-tight seal is to be provided between coupled parts, and I therefore do not wish to be limited to the specific details of construction disclosed, since it will be understood that these may be varied to meet any particular construction and within the range of engineering skill, without departing from the spirit of the invention.

In the appended claims the fitting or fixture 10 is referred to as an entered member, and the valve stem or equivalent part, which is engaged or received by the fitting, as an entering member. These terms are to be considered as generic to the present disclosure and all equivalents thereof.

What I claim is:

1. A device of the class described, comprising a tubular entered member having a tapered seat within its bore, a tubular entering member having at its entering end a fixed non-deformable seating face and a removable element having a compressible gasket fixedly carried thereby for providing an air-tight seal with said tapered seating face, and means for simultaneously forcing the gasket and the fixed non-deformable seating face on the member to which it is connected into engagement with the tapered seat as the members are being coupled together.

2. A device of the class described, comprising a tubular entered member having a tapered non-deformable seat within its bore, a tubular entering member having at its entering end a fixed non-deformable seating face, a removable element at the entering end of the entering member having a compressible gasket, and means for simultaneously compressing the gasket between the non-deformable seating faces on the members and forcing said non-deformable seating faces on the members into engagement as the members are coupled together.

3. A device of the class described, comprising a tubular entered member having a tapered seat and a reentrant projection within its bore, a tubular entering member having at its entering end a seating face, a removable tubular element screw-threadedly engaging in the entering end of the entering member and extending beyond the seating face thereon, said removable element having a compressible gasket, and means for simultaneously compressing the gasket between the seating faces on the members, forcing the reentrant projection into the removable element to expand the latter and forcing said seating faces on the entering and entered members into engagement as said latter members are coupled together.

4. A device of the class described, comprising a tubular entered member having within its bore a seating face and a reentrant projection having an external seating face, an entering member having at its entering end a compressible gasket and relatively non-deformable internal and external seating faces, the reentrant projection on the entered member being adapted to engage within the bore of the entering member, and means for simultaneously forcing the complemental seating faces on the members into engagement while compressing the gasket between the internal seating face on the entered member and the external seating face on the entering member.

5. A device of the class described, comprising a tubular entered member having within its bore a seating face and a reentrant projection having an external tapered seating face, an entering member having at its entering end a non-deformable seating face on a tubular element within said end adapted to receive and make contact with the reentrant projection, said tubular element having at its outer end a compressible gasket, and means for simultaneously forcing the tapered projection into contact with the tubular element and forcing the seating faces on the entered and entering members into engagement while compressing the gasket between the last-mentioned seating faces.

6. A device of the class described, comprising a tubular metallic entered member having within its bore a tapered seating face and a reentrant tapered projection, a tubular metallic entering member having at its entering end a bore adapted to receive the tapered projection and an external seating face adapted to engage the tapered seating face on the entered member, a compressible gasket, and means for coupling the members together during which action the reentrant projection will press radially outwardly against the wall of the bore of the entering member and the tapered seating face on the entered member will press radially inwardly upon the external seating face on the entering member to provide both internal and external spaced metal to metal seals between the members and the gasket will be compressed to make rubber to metal seals with both the entered and entering members between the metal to metal seals.

7. In combination, a tire valve stem having a valve therein, the valve pin of which extends to approximately the top of the valve stem, a bushing threaded into the top of the valve stem having a packing gasket at its outer end, a fitting having a valve pin depressor engaging over the end of said valve stem and bearing radially outwardly against said bushing, said fitting compressing the packing gasket into engagement with the top of the valve stem, the wall of the depressor and a shoulder within the fitting, and a coupling sleeve for holding said fitting onto the valve stem with the various parts in the relationship set forth.

JAY HARRY CLO.